(12) United States Patent
Sonnevi et al.

(10) Patent No.: US 10,187,912 B2
(45) Date of Patent: Jan. 22, 2019

(54) PROCEDURE AND NODE FOR INTERCONNECTING RAN AND SERVICE LAYER ENTITIES

(71) Applicant: Telefonaktiebolaget L M Ericsson (publ), Stockholm (SE)

(72) Inventors: Fredrik Sonnevi, Hägersten (SE); Bengt Persson, Stockholm (SE)

(73) Assignee: Telefonaktiebolaget L M Ericsson ((publ), Stockholm (SE)

( * ) Notice: Subject to any disclaimer, the term of this patent is extended or adjusted under 35 U.S.C. 154(b) by 176 days.

(21) Appl. No.: 14/655,841

(22) PCT Filed: Mar. 13, 2013

(86) PCT No.: PCT/SE2013/050233
§ 371 (c)(1),
(2) Date: Jun. 26, 2015

(87) PCT Pub. No.: WO2014/142717
PCT Pub. Date: Sep. 18, 2014

(65) Prior Publication Data
US 2015/0351140 A1    Dec. 3, 2015

(51) Int. Cl.
*H04W 8/08*  (2009.01)
*H04W 76/00*  (2018.01)
(Continued)

(52) U.S. Cl.
CPC .......... *H04W 76/10* (2018.02); *H04W 8/082* (2013.01); *H04W 76/11* (2018.02); *H04W 92/045* (2013.01)

(58) Field of Classification Search
CPC ... H04W 76/021; H04W 8/082; H04W 76/02; H04W 92/045
See application file for complete search history.

(56) References Cited

U.S. PATENT DOCUMENTS 9,301,333 B2 * 3/2016 Chin ................. H04W 36/0022
2011/0058479 A1 * 3/2011 Chowdhury ............ H04L 45/04
370/237
(Continued)

FOREIGN PATENT DOCUMENTS

WO    2011020624 A2    2/2011

OTHER PUBLICATIONS

Huawei et al, "Support of SIPTO at the Local Network", SA WG2 Meeting #95, Prague, Czech Republic, Jan. 28-Feb. 1, 2013, S2-130690.*
(Continued)

*Primary Examiner* — Shailendra Kumar
(74) *Attorney, Agent, or Firm* — Withrow & Terranova, PLLC

(57) ABSTRACT

The embodiments herein relate to a method in a first network node for connecting nodes in a communications network. The first network node receives, from a RAN node, information indicating the RAN node and a communications resource which the at least one RAN node is responsible for. The first network node receives, from a second network node, a request for information indicating a serving RAN node which serves a communications resource. The communications resource served by the serving RAN node is one of the communications resource which the received information indicates. The first network node identifies the serving RAN node based on the received information and request. The first network node establishes a connection between the identified serving RAN node and the second network node.

18 Claims, 4 Drawing Sheets

(51) Int. Cl.
  *H04W 76/10*  (2018.01)
  *H04W 76/11*  (2018.01)
  *H04W 92/04*  (2009.01)

(56) References Cited

U.S. PATENT DOCUMENTS

2012/0182940 A1* 7/2012 Taleb ............... H04L 29/12066
  370/328
2013/0315068 A1* 11/2013 Kim ..................... H04W 28/12
  370/236

OTHER PUBLICATIONS

Zte, "Indicating bearer type to the H(e)NB when the LIPA or SIPTO@LN function is activated", SA WG2 Meeting #95, Prague, Czech Republic, Jan. 28-Feb. 1, 2013, S2-130232.*
3rd Generation Partnership Project; Technical Specification Group Services and System Aspects; Local IP Access and Selected IP Traffic Offload (LIPA-SIPTO), Mar. 2011, 3GPP TR 23.829 V10.0.0.*
3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 3GPP TS 23.401 V10.0.0.*
Author Unknown, "Technical Specification Group Services and System Aspects; Local IP access (LIPA) mobility and Selected IP Traffic Overload (SIPTO) at the local network (Release 12)," Technical Report 23.859, Version 12.0.0, 3GPP Organizational Partners, Mar. 8, 2013, 68 pages.
Huawei, et al., "S2-130690: Support of SIPTO at the Local Network," Change Request, 3rd Generation Partnership Project (3GPP), SA WG2 Meeting #95, Prague, Czech Republic, Jan. 28-Feb. 1, 2013, 22 pages.
Zte, "S2-130230: Indicating H(e)NB's LIPA or SIPTO@LN capability to the core network," Change Request, 3rd Generation Partnership Project (3GPP), SA WG2 Meeting #95, Prague, Czech Republic, Jan. 28-Feb. 1, 2013, 34 pages.
Zte, "S2-130232: Indicating bearer type to the H(e)NB when the LIPA or SIPTO@LN function is activated," Change Request, 3rd Generation Partnership Project (3GPP), SA WG2 Meeting #95, Prague, Czech Republic, Jan. 28-Feb. 1, 2013, 21 pages.
International Preliminary Report on Patentability for International Patent Application No. PCT/SE2013/050233, completed Feb. 24, 2015, 5 pages.
International Search Report and Written Opinion for International Patent Application No. PCT/SE2013/050233, dated Jan. 3, 2014, 9 pages.

* cited by examiner

PROCEDURE AND NODE FOR INTERCONNECTING RAN AND SERVICE LAYER ENTITIES

This application is a 35 U.S.C. § 371 national phase filing of International Application No. PCT/SE2013/050233, filed Mar. 13, 2013, the disclosure of which is incorporated herein by reference in its entirety.

TECHNICAL FIELD

Embodiments herein relate generally to a first network node and a method in the first network node. More particularly the embodiments herein relate to connecting nodes in a communications network.

BACKGROUND

In a communications network a wireless device communicates via a Radio Access Network (RAN) to one or more Core Networks (CNs). The communications network may also be referred to as e.g. a wireless communications network, a wireless communications system, a communications network, a communications system, a network or a system.

The wireless device may be a device by which a subscriber may access services offered by an operator's network and services outside an operator's network to which the operator's radio access network and core network provide access, e.g. access to the Internet. The wireless device may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device may be portable, pocket storable, hand held, computer comprised, or vehicle mounted devices, enabled to communicate voice and/or data, via the radio access network, with another entity, such as another wireless device or a server.

The wireless device is enabled to communicate wirelessly within the communications network. The communication may be performed e.g. between two wireless devices, between a wireless device and a regular telephone and/or between the wireless device and a server via the radio access network and possibly one or more core networks and possibly the Internet.

The radio access network covers a geographical area which is divided into cell areas, with each cell area being served by a base station. The base station is in some radio access networks also called Radio Base Station (RBS), evolved NodeB (eNB), NodeB or B node. A cell is a geographical area where radio coverage is provided by the base station at a base station site. The base station communicates over an air interface with the wireless device(s) within range of the base station.

Currently, Internet is in a transition phase from wireline content consumption of e.g. YouTube, Spotify etc. to a radio based consumption. Compared to the wireline transport, the radio is a much more scarce resource with, in some cases, poor performance. There is therefore a need to improve the wireless experience both from a network resource, network efficiency and end user point of view. The wireless experience may be improved by for instance increasing the battery lifetime in the wireless device as well as providing faster and more secure delivery of application data.

In communications networks there is a need for coordination of information associated with a wireless device and its information flow, in addition to the radio condition in the current cell in which the wireless device is located and potential cells to which the wireless device may move in the future. The coordination is performed in order to allow optimal use of expensive radio resources and in order to provide a sufficiently good service to the wireless device as it moves around in the communications network. Different radio technologies use different methods for achieving such information coordination. For example, in Global System for Mobile Communications (GSM) and Wideband Code Division Multiple Access (WCDMA), the information associated with the wireless device is collected and coordinated in a radio controller. The radio controller may be the Base Station Controller (BSC) in GSM and the Radio Network Controller (RNC) in WCDMA. While in WiFi the information associated with the wireless device is mainly collected and coordinated in the wireless device itself. In Long Term Evolution (LTE), the information is collected and coordinated in the eNB, i.e. the base station. Furthermore different identifiers are used for the same wireless device in different radio technologies.

A problem with the existing technology is how all actors involved with a specific wireless device and its corresponding services should find each other in a way that does not cost more in terms of processing power than the value of the improved usage of the radio resources. In addition, a communications network may support many wireless devices, for example up to 10 000 000 wireless devices of one operator in a single metropolitan area. The enormous amount of wireless devices prohibits the use of simple databases to coordinate the information.

SUMMARY

An object of embodiments herein is therefore to obviate at least one of the above disadvantages and problems and to provide improved communication in a communications network.

According to a first aspect, the object is achieved by a method in a first network node for connecting nodes in a communications network. The first network node receives, from at least one RAN node, information indicating the at least one RAN node and at least one communications resource which the at least one RAN node is responsible for. The first network node receives, from a second network node, a request for information indicating a serving RAN node which serves a communications resource. The communications resource served by the serving RAN node is one of the at least one communications resource which the received information indicates. The first network node identifies the serving RAN node based on the received information and the received request. The first network node establishes a connection between the identified serving RAN node and the second network node, enabling the serving RAN node and the second network node to communicate with each other.

According to a second aspect, the object is achieved by a first network node for connecting nodes in a communications network. The first network node comprises a receiver which is adapted to receive, from at least one RAN node, information indicating the at least one RAN node and at least one communications resource which the at least one RAN node is responsible for. The receiver is further adapted to receive, from a second network node, the request for information indicating the serving RAN node which serves a communications resource. The communications resource served by the serving RAN node is one of the at least one communications resource which the received information indicates. The first network node comprises an identifying unit adapted to identify the serving RAN node based on the received information and the received request. The first network node comprises an establishing unit which is adapted to establish the connection between the identified serving RAN node and the second network node, enabling the serving RAN node and the second network node to communicate with each other.

Since the first network node establishes a connection between the serving RAN node and the second network node so that they can communicate with each other, the communication in the communications network is improved.

Embodiments herein afford many advantages, of which a non-exhaustive list of examples follows.

The coordination the Radio Network Layer (RNL) (represented by a RAN node) and the Content (service) Layer (represented by the second network node) provides benefits for both the end user, i.e. the owner of the wireless device, and the mobile infrastructure owner.

For the end user, an advantage of the embodiments herein is that the battery lifetime of the wireless device may be significantly improved, which is a problem on e.g. the current smart phones. Furthermore, the delivery of content to/from a wireless device may be secured since it may be adopted according to the available communications resources.

For the mobile infrastructure owner, an advantage of the embodiments herein is that the infrastructure resources may be utilized more efficiently i.e. controller and base station processors, radio spectrum etc. Another advantage is that the infrastructure investments may be postponed due to the more efficient resource utilization. A further advantage is that the network load may be decreased since the load may be distributed over time.

The embodiments herein allow these advantages to be implemented in real large scale communications networks without very complex scaling impacts and with limited impacts on existing nodes and networks structure.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein bind together the source of data (e.g. a YouTube server) with the anchoring RAN node (such as e.g. the RNC, eNB, WiFi AP, BSC etc) so that they can communicate and exchange information. The embodiments herein may also connect together RAN nodes such as a Wi-Fi controller and a RNC in order to achieve efficient Radio Access Bearer (RAB) handling (e.g. in the case of a handover between WiFi to WCDMA).

In order to do this a mechanism which locates and identifies the serving RAN node is elaborated herein. This information may then be transferred to the source of the data and used for setting up a connection between the source of data and the RAN nodes.

The current RAN solutions do not take the end user content layer in to account when performing RAB handling (such as channel switching, mobility etc.). Currently the RAN systems do not have the information to perform such tasks.

Figure 1:
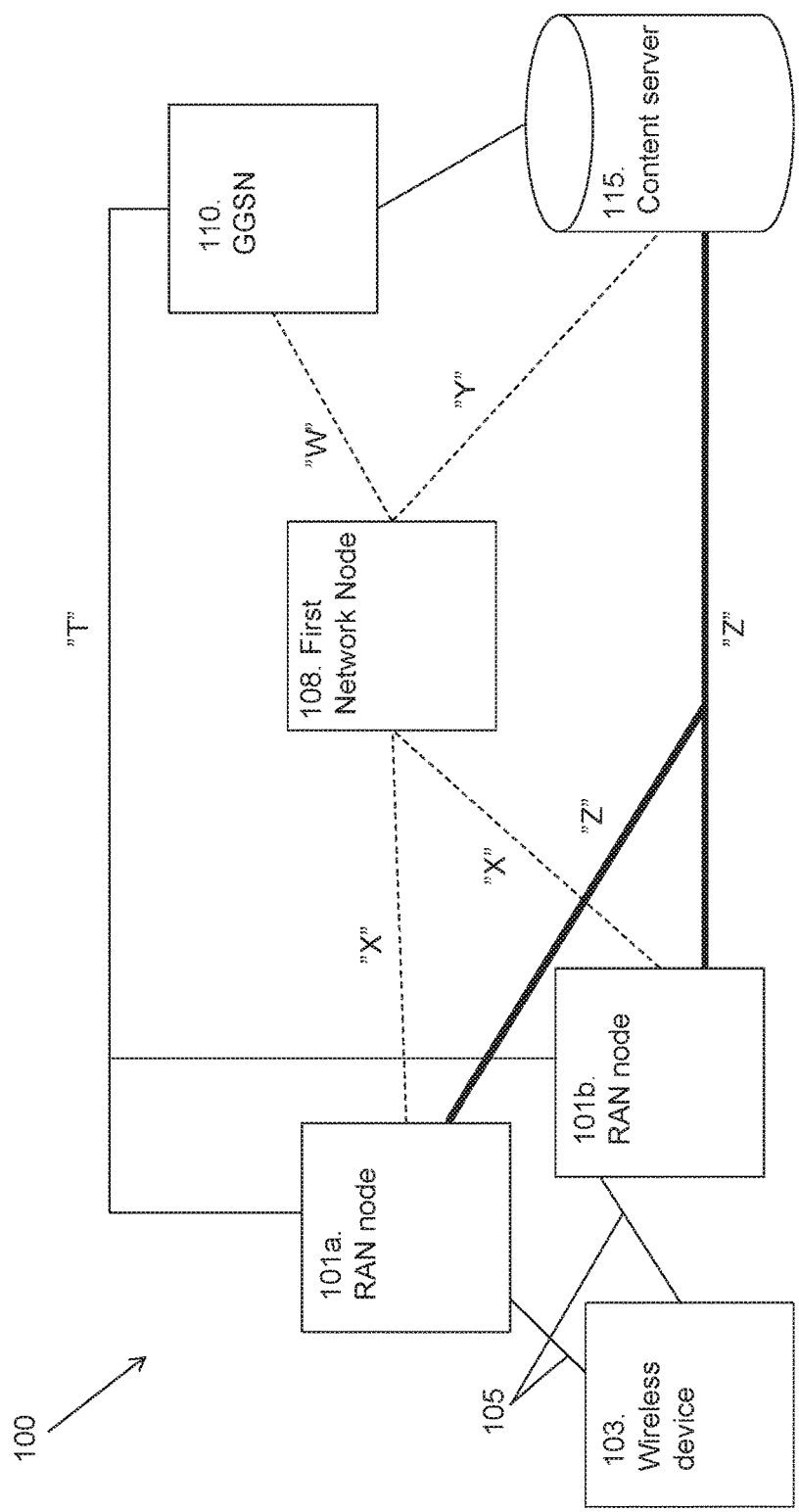
FIG. 1 is a schematic block diagram illustrating embodiments of a communications network.

FIG. 1 depicts a communications network 100 in which embodiments herein may be implemented. The communications network 100 may in some embodiments apply to one or more radio access technologies such as for example LTE, LTE Advanced, WCDMA, GSM, Internet Cache, Service layer proxy, Transport layer proxy, Cdma-2000, Worldwide Interoperability for Microwave Access (WiMax), Time Division-Synchronous Code Division Multiple Access (TD-SCMA), Time Division-Long Term Evolution (TD-LTE), any other Third Generation Partnership Project (3GPP) radio access technology, or other radio access technologies such as e.g. Wireless Local Area Network (WLAN).

In FIG. 1, the communications network 100 is exemplified with two RAN nodes, a first RAN node 101a and a second RAN node 101b. However, the skilled person will understand that any other suitable number of RAN nodes may be comprised in the communications network 100. In the following, the RAN nodes in the communications network 100 regardless of how many RAN nodes which are present is referred to as the at least one RAN node 101a, 101b. The at least one RAN node 101a, 101b may be a BSC, a RNC, a WiFi controller, a base station such as a eNB, or any other network node capable of communicating over a radio carrier with a wireless device 103 which the at least one RAN node 101a, 101b is responsible for.

The wireless device 103 may be a device by which a subscriber may access services offered by an operator's network and services outside the operator's network to which the operator's radio access network and core network provide access, e.g. access to the Internet. The wireless device 103 may be any device, mobile or stationary, enabled to communicate over a radio channel in the communications network 100, for instance but not limited to e.g. user equipment, mobile phone, smart phone, sensors, meters, vehicles, household appliances, medical appliances, media players, cameras, M2M device or any type of consumer electronic, for instance but not limited to television, radio, lighting arrangements, tablet computer, laptop or PC. The wireless device 103 may be portable, pocket storable, hand held, computer comprised, or vehicle mounted devices, enabled to communicate voice and/or data, via the radio access network, with another entity, such as another wireless device or a server.

It should be noted that the communications link 105 between the at least one RAN node 101a, 101b and the wireless device 103 may be of any suitable kind. The communications link 105 may use any suitable protocol depending on type and level of layer (e.g. as indicated by the Open Systems Interconnection (OSI) model) as understood by the person skilled in the art.

Furthermore, the communications network 100 comprises a first network node 108 which also may be referred to as a RAN Locator or a centralized registration node. The first network node 108 may be co-located in another node in the communications network 100 or it may be a standalone node in the communications network 100. The first network node 108 may have a interface X with each of the respective RAN nodes 101a, 101b in the communications network 100. The first network node 108 and its function will be described in detail below with reference to the signaling diagram in FIG. 2.

The communications network 100 comprises a Gateway GPRS Support Node (GGSN) 110, where GPRS is short for General Packet Radio Service. The GGSN 110 is a network node responsible for interworking between the GPRS network and the external packet switched networks such as the Internet. The GGSN 110 keeps a record of all active wireless devices 103 and their respective Serving GPRS Support Nodes (SGSNs) to which they are connected. The GGSN 110 allocates Internet Protocol (IP) addresses to the wireless device 103 and is also responsible for billing. The GGSN 110 has an interface W towards the first network node 108, and an interface T towards the at least one RAN node 101a, 101b.

The communications network 100 comprises a content server 115. The content server 115 may be for example a Spotify server or a Facebook server. The content server 115 has an interface Y towards the first network node 108 and an interface Z towards the RAN node 101a, 101b.

The term second network node 101b, 115 is used to refer to one of the content server 115, a RAN node 101b, an Internet cache, a service layer proxy, or a transport layer proxy etc. The second network node 101b, 115 may be a requesting node requesting information indicating a serving RAN node from the first network node 108. The second network node 101b, 115 and its function will be described in detail below with reference to the signaling diagram in FIG. 2.

The term third network node 110, 115 is used to refer to one of the GGSN 110, a SGSN, a Home Location Register (HLR), a Visiting Location Register (VLR) or the content server 115. A SGSN is a network node which handles all packet switched data in the communications network 100, such as for example mobility management and authentication of wireless devices. HLR is a database in which information from all subscribers of wireless devices are stored, such as subscriber identity, telephone number, associated services and general location information. VLR is a database which comprises information indicating the exact location of the wireless devices. This information is necessary in order to route a call to the correct base station. The third network node 110, 115 and its function will be described in detail below with reference to the signaling diagram in FIG. 2.

Figure 2:
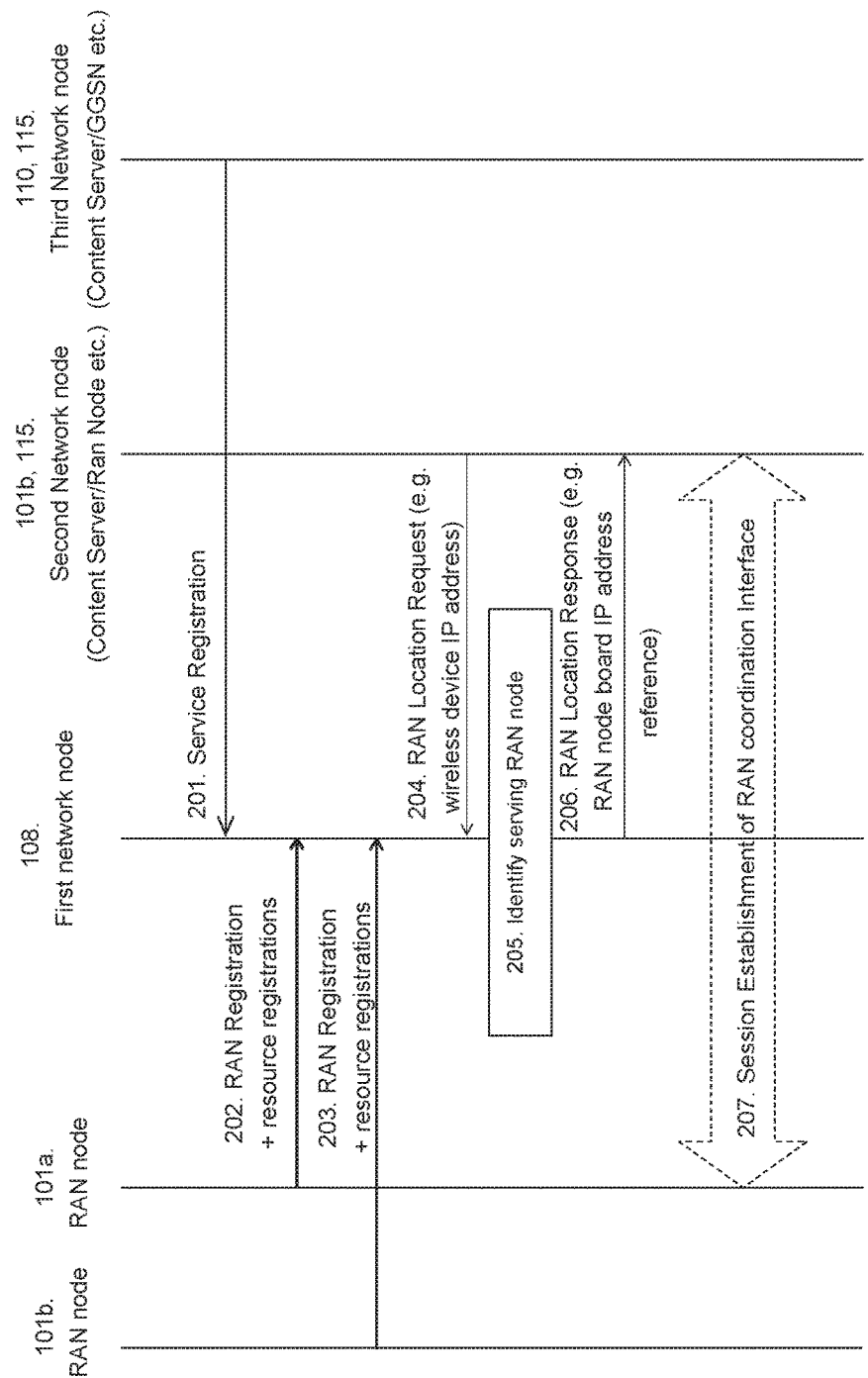
FIG. 2 is a signaling diagram illustrating embodiments of a method in the communications network.

The method for handling connection of nodes in a communications network 100 according to some embodiments will now be described with reference to the signaling diagram in FIG. 2. The signaling procedure between the service providing node (e.g. the content server 115 or the GGSN 110) and the at least one RAN node 101a, 101b in FIG. 2 is just an example. However, a similar procedure would be used if coordination between e.g. two RAN nodes 101a, 101b would be needed. In FIG. 2, the wireless device 103 is used as an example of a communications resource. However, other types of communications resources are also applicable, such as e.g. a cell, a base station, a transport link or a processor. The method comprises the following steps, which steps may as well be carried out in another suitable order than described below.

Step 201—Service Registration

As services are established in the communications network 100, information related to these services are registered in the first network node 108. The services are represented by RAB's and may be described as user plane connections between the wireless device 103 and the core network. Features such as data rates, bandwidth and Quality of Service (QoS) of a RAB may be set by the core network according to requirements of the application using the RAB. Thus, different types of RABs may be established at the request of the core network. The configuration of the RAB is determined by the radio access network based on information from the core network. A RAB may be described as a connection which is established between the core network and the RAN. User data is transmitted in the RAB. The service layer generates user data, and the core network enters the user data into the RAB. There is signaling between the nodes which handle the RABs and the nodes which handle the service layer.

As an example, the GGSN 110 or the content server 115 may register the IP address, International Mobile Subscriber Identity (IMSI), Tunnel endpoint identifier (TEID) etc. for an established RAB associated with the end user, i.e. the wireless device 103 by transmitting the IP address, IMSI, TEID to the first network node 108. IMSI is a unique identifier of the wireless device 103. TEID is a parameter which identifies a tunnel endpoint related to a path to a wireless device 103. As another example, the first network node 108 may retrieve the relevant information related to these services from nodes such as the SGSN, the HLR, the VLR etc.

The first network node 108 may also use nodes such as the GGSN 110, the SGSN, the HLR, the VLR etc. for translation between different identities of the wireless device 103 used in different environments. As mentioned above, the wireless device 103 may have different identities in different radio technologies.

If the RAB is ended or changed, the first network node 108 updates its information accordingly by removing or updating its RAB information.

The first network node 108 may store the information indicating the established RABs in a memory unit, e.g. the memory 410 which will be described later in relation to FIG. 4.

Step 202 and 203—RAN Node Registration

Each RAN node 101a, 101b in the communications network 100 wishing to participate in the end user service optimization announces or registers itself to the first network node 108. The RAN node registration is triggered by a RAN establishment request. In WiFi, a corresponding request triggers the registration. After the at least one RAN node 101a, 101b has been accepted by the first network node 108, the at least one RAN node 101a, 101b may start to register information indicating the communications resource(s) it is responsible for at the first network node 108. If the at least one RAN node 101a, 101b is not accepted by the first network node 108, the first network node 108 sends a reject signal to the at least one RAN node 101a, 101b. The communications resource may be a wireless device 103, a cell, a radio base station, a transport link, processing capacity etc. The communications resources affect decisions related to mobility and services.

Using the example where the communications resource is a wireless device 103. For each wireless device 103 registered in the first network node 108, a termination point identity (e.g. IP address of the controlling RAN node and a node internal reference) is registered at the first network node 108. The termination point identity is needed in order to establish the point to point contact between the second network node 101b, 115 and a serving RAN node 101a which serves a particular wireless device 103 amongst the wireless devices which are registered in the first network node 108.

Applicable RAN node identities such as Cell ID, IMSI, Temporary International Mobile Subscriber Identity (TIMSI), International Mobile Equipment Identity (IMEI) are registered together with the wireless device(s) in the first network node 108. The Cell ID is a unique identity which identifies the cell, i.e. the geographical area, which the RAN node is responsible for. TIMSI is a random number that is created from the subscriber's IMSI number in order to provide additional security. IMEI identifies the wireless device 103 and has no permanent or semi-permanent relation to the subscriber.

Information corresponding to the information described above for the wireless device 103 is registered in the first network node 108 when the communications resource is a cell, a base station, a transport link, a processor etc. However, this information is not described in more detail here since the skilled person will understand what type of information this will be.

Each RAN node 101a, 101b in the communications network 100 may register a communications resource, de-register a communications resource and/or inquire information indicating a communications resource.

The first network node 108 may subscribe to status changes related to the wireless device(s) and other communications resources which the at least one RAN node 101a, 101b is responsible for in order to obtain updated information.

Step 204—Locating Endpoints (Request)

The second network node 101b, 115 initiates contact with the first network node 108. As mentioned above, the second network node 101b, 115 may be a RAN node 101b or the content server 115. Using the example where the communications resource is a wireless device 103 again. The second network node 101b, 115 is triggered to contact the first network node 108 when it detects that the wireless device 103 has e.g. low coverage or that the operator with which the wireless device 103 is registered requests information. This is known when for example a new application is started on the wireless device 103 or that a handover of the wireless device 103 is performed. This contact may start with an authentication of the second network node 101b, 115. The authentication prevents that an unauthorized party requests information or controls decisions. After authentication, the second network node 101b, 115 may request interaction with the RAN layer, i.e. a RAN node 101a, 101b, by transmitting a RAN location request to the first network node 108. The RAN location request is a request for information indicating a serving RAN node 101a which serves a particular wireless device 103. Such request may comprise the IP address of the termination point in the second network node 101b, 115, i.e. RAN layer information end point in the second network node 101b, 115. The request may further comprise an identity of a RAB associated with the served wireless device 103, i.e. the wireless device IP address, IMSI, Transmission Control Protocol (TCP) port, Hyper Text Transfer Protocol (HTTP) session ID etc.

Step 205—Locating Endpoints

Based on the registered information in steps 202 and 203 and the information in the location request, the first network node 108 is able to identify and locate the serving RAN node 101a which serves the particular communications resource, e.g. the particular wireless device 103.

Step 206—Locating Endpoints (Response)

When the serving RAN node 101a is identified, the first network node 108 replies to the second network node 101b, 115 by transmitting a response comprising information such as the IP address of the serving RAN node 101a, the identity of the served communications resource, e.g. the IMSI, T-IMSI, Media Access Control (MAC) address etc. associated with the served wireless device 103 when the wireless device 103 is the communications resource.

Step 207—Session Establishment

Based on the steps 202-206, a connection and/or session is established between the second network node 101b, 115 and the serving RAN node 101a. The establishment is initiated by that the second network node 101b, 115 transmits a session establishment request to the identified serving RAN node 101a. The session establishment request comprises information such as the IP address of the termination point in the second network node 101b, 115, i.e. the RAN layer information end point in the second network node 101b, 115. In other words, information indicating the serving RAN node 101a. Furthermore, the session establishment request may comprise information related to the served communications resources. Using the example where the wireless device 103 is the communications resource, the information may be the identity of the wireless device served by the serving RAN node 101a, i.e. the IP address of the wireless device 103, IMSI, TCP port, HTTP session ID etc. The QoS class associated with the session establishment, a session ID and a type of service requested may also be transmitted to the serving RAN node 101a.

The serving RAN node 101a acknowledges the session establishment request from the second network node 101b, 115 by transmitting a session establishment response comprising information such as Service "Acknowledged", QoS class for session establishment, Session ID etc.

After the session establishment has been completed, the serving RAN node resource information and control data is transferred over an interface between the second network node 101b, 115 and the serving RAN node 101a. The interface is indicated as Z in FIG. 1.

In case that the Radio Bearer (RB) anchor point in the radio access network changes (e.g. a handover from WCDMA to LTE), the session between the second network node 101b, 115 and the serving RAN node 101a may need to be reallocated or reestablished due to that the anchor point has moved, i.e. there is a new serving RAN node.

The session between the second network node 101b, 115 and the serving RAN node 101a may be terminated by either side in case the communications resource has disappeared from the serving RAN node 101a or the second network node 101b, 115.

RAN Node Services Provided to the Second Network Node—Content Server

This section describes a scenario where the second network node 101b, 115 is represented by the content server 115, and describes which services that are provided by the serving RAN node 101a over the session layer interface to the content server 115. The content server 115 may transmit a request to the serving RAN node 101*a* for information indicating the maximum available throughput for the wireless device 103 which the serving RAN node 101*a* serves, the round trip time for the wireless device 103, the cell load in a specific cell etc. The content server 115 has the IP address of the wireless device 103 which it gets by looking at the destination IP address in the IP header. In some embodiments, the content server 115 has more detailed information regarding the wireless device 103. The content server 115 may request the serving RAN node 101*a* to transmit information of the cell load every 100 ms, to transmit an indication if the maximum wireless device throughput goes below 1 Mbit/s etc. Furthermore, the content server 115 may request the serving RAN node 101*a* to perform an immediate down switch to a certain channel, such as the Forward Access CHannel (FACH) or to perform a configuration of a radio link based on a new QoS etc. The content server 115 may also transmit an order to the serving RAN node 101*a* to transmit e.g. a 5 MB data file to the wireless device 103 every 30 seconds etc. The description above uses the example where the wireless device 103 is the communications resource. However, any other type of communications resource is equally applicable as understood by the skilled person.

RAN Node Services Provided to the Second Network Node—RAN Node to RAN Node

This section describes a scenario where the second network node 101*b*, 115 is represented by a RAN node 101*b*. In this scenario, one RAN node 101*b* tries to contact another RAN node 101*a*. One use case for this scenario is when one RAN node 101*b* tries to identify how the conditions are in another RAN node 101*a*. A reason for the need to identify these conditions may be to investigate if the performance for the wireless device 103 will improve if it is moved to the other RAN node 101*a*.

Figure 3:
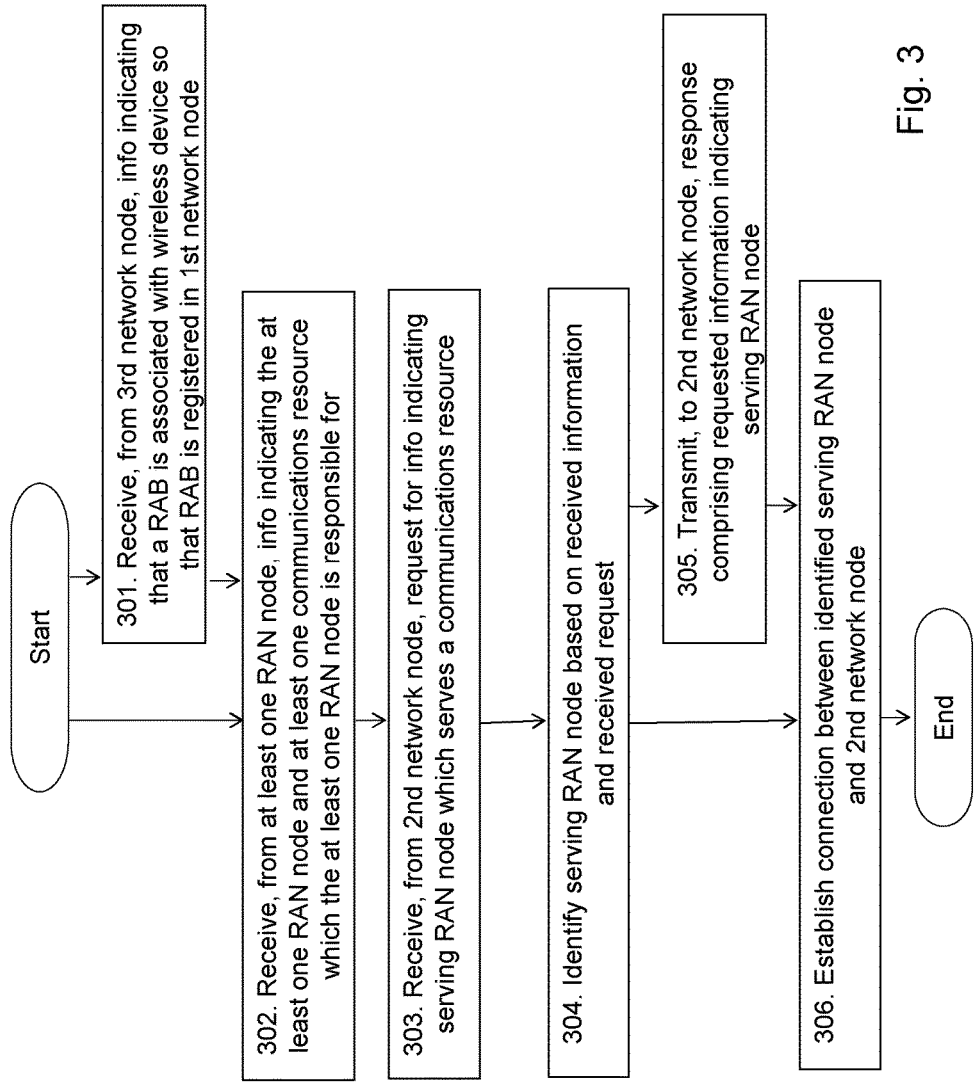
FIG. 3 is a schematic block diagram illustrating embodiments of a first network node.

The method described above will now be described seen from the perspective of the first network node 108. FIG. 3 is a flowchart describing the present method in the first network node 108 for connecting nodes in the communications network 100. The first network node 108 may be co-located in a node in the communications network 100 or it may be a standalone node in the communications network 100. The method comprises the followings steps to be performed by the first network node 108, which steps may be performed in any suitable order:

Step 301

This step corresponds to step 201 in FIG. 2. In some embodiments, the first network node 108 receives, from a third network node 110, 115, information indicating that a RAB is associated with a wireless device 103 so that the RAB is registered in the first network node 108.

The received information indicating that the RAB is associated with the wireless device 103 may comprise at least one of an address to the wireless device 103 and an identity of the wireless device 103, which address and identity are associated with a service established for the wireless device 103 in the communications network 100.

The third network node 110, 115 may be represented by at least one of the GGSN 110, a SGSN, a HLR, a VLR or the content server 115.

Step 302

This step corresponds to steps 202 and 203 in FIG. 2. The first network node 108 receives, from at least one RAN node 101*a*, 101*b*, information indicating the at least one RAN node 101*a*, 101*b* and at least one communications resource which the at least one RAN node 101*a*, 101*b* is responsible for. The at least one communications resources may be at least one of the wireless device 103, a cell in the communications network 100, a base station in the communications network 100, a transport link in the communications network 100 and a processor.

The at least one RAN node 101*a*, 101*b* may be represented by at least one of a BSC, a RNC, an eNB or a WiFi controller.

Step 303

This step corresponds to step 204 in FIG. 2. The first network node 108 receives, from the second network node 101*b*, 115, a request for information indicating a serving RAN node 101*a* which serves a communications resource. The communications resource served by the serving RAN node 101*a* is one of the at least one communications resource which the information received in step 302 indicates.

The request for information indicating the serving RAN node 101*a* may comprise information of an address associated with the second network node 101*b*, 115 and information identifying the communications resource.

The serving RAN node 101*a* may be represented by at least one of BSC, a RNC, an eNB or a WiFi controller. The second network node 101*b*, 115 is represented by at least one of a content server 115, a RAN node 101*b*, an Internet cache, a service layer proxy or a transport layer proxy.

Step 304

This step corresponds to step 205 in FIG. 2. The first network node 108 identifies the serving RAN node 101*a* based on the information received in step 302 and the request received in step 303.

Step 305

This step corresponds to step 206 in FIG. 2. In some embodiments, the first network node 108 transmits, to the second network node 101*b*, 115, a response comprising the requested information indicating the serving RAN node 101*a*. The response further comprises an identity of the serving RAN node 101*a* and an identity of the communications resource served by the serving RAN node 101*a*.

Step 306

This step corresponds to step 207 in FIG. 2. The first network node establishes a connection between the identified serving RAN node 101*a* and the second network node 101*b*, 115. This enables the serving RAN node 101*a* and the second network node 101*b*, 115 to communicate with each other. In other words, the source of data (e.g. a YouTube server) is connected to with the anchoring RAN node (such as e.g. the RNC, eNB, WiFi AP, BSC etc.) so that they can communicate and exchange information. Or RAN nodes may be connected to each other such as a Wi-Fi controller and a RNC in order to achieve efficient RAB handling (e.g. in the case of a handover between WiFi to WCDMA).

Figure 4:
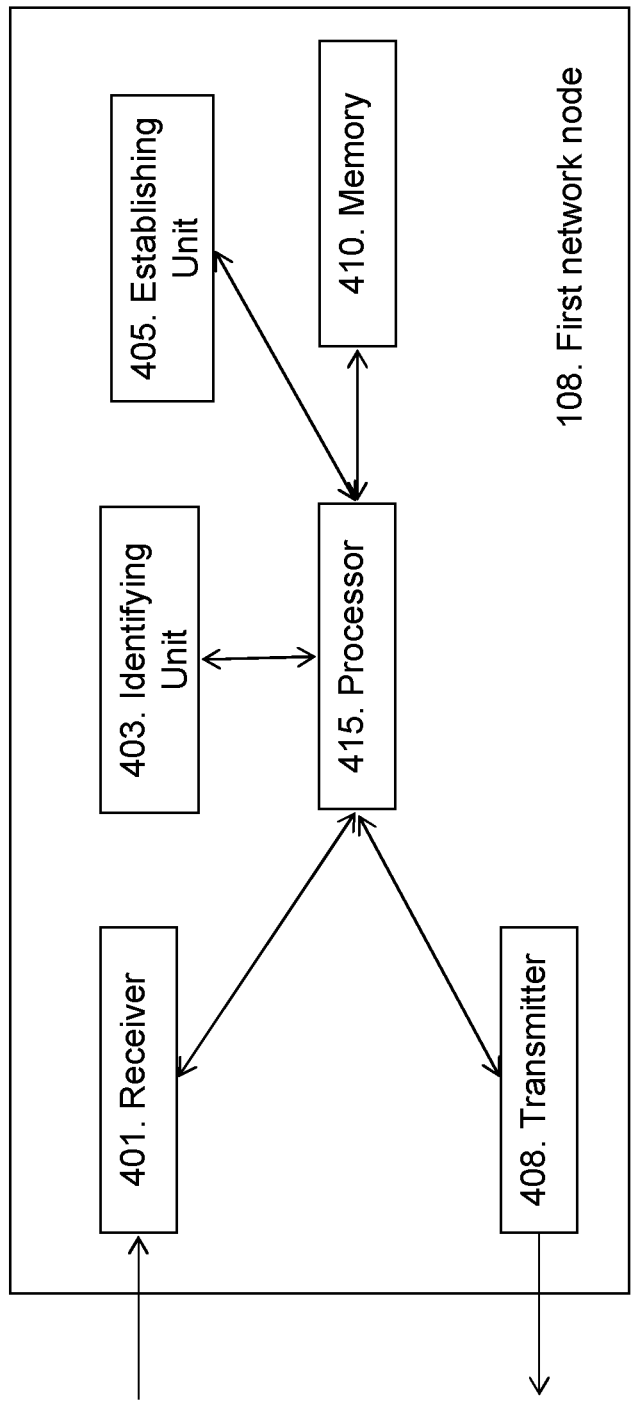
FIG. 4 is a flow chart illustrating embodiments of a method in the first network node.

To perform the method steps shown in FIG. 3 for connecting nodes in the communications network 100, the first network node 108 comprises an arrangement as shown in FIG. 4. The first network node 108 may be co-located in a node in the communications network 100 or it may be a standalone node in the communications network 100.

The first network node 108 comprises a receiver 401 which is adapted to receive, from at least one RAN node 101*a*, 101*b*, information indicating the at least one RAN node 101*a*, 101*b* and at least one communications resource which the at least one RAN node 101*a*, 101*b* is responsible for. The at least one communications resource may be at least one of the wireless device 103, a cell in the communications network 100, a base station in the communications network 100, a transport link in the communications network 100 and a processor. The at least one RAN node 101a, 101b may be represented by at least one of a BSC, a RNC, an eNB or a WiFi controller.

The receiver 401 is further adapted to receive, from the second network node 101b, 115, the request for information indicating a serving RAN node 101a which serves a communications resource. The communications resource served by the serving RAN node 101a is one of the at least one communications resource which the received information indicates. The request for information indicating the serving RAN node 101a may comprise information of an address associated with the second network node 101b, 115 and information identifying the communications resource. The serving RAN node 101a may be represented by at least one of a BSC, a RNC, an eNB or a WiFi controller. The second network node 101b, 115 may be represented by at least one of a content server 115, a RAN node 101b, an Internet cache, a service layer proxy or a transport layer proxy.

The receiver 401 is further adapted to receive, from a third network node 110, 115, information indicating that a RAB is associated with a wireless device 103 so that the RAB is registered in the first network node 108. The received information indicating that the RAB is associated with the wireless device 103 may comprise at least one of an address to the wireless device 103 and an identity of the wireless device 103. The address and identity are associated with a service established for the wireless device 103 in the communications network 100. The third network node 110, 115 may be represented by at least one of a GGSN 110, a SGSN, a HLR, a VLR or a content server 115.

The first network node 108 comprises an identifying unit 403 which is adapted to identify the serving RAN node 101a based on the received information and the received request.

The first network node 108 comprises an establishing unit 405 which is adapted to establish a connection between the identified serving RAN node 101a and the second network node 101b, 115. This enables the serving RAN node 101a and the second network node 101b, 115 to communicate with each other.

The first network node 108 may further comprise a memory 410 comprising one or more memory units. The memory 410 is arranged to be used to store data, received data streams, power level measurements, threshold values, time periods, configurations, schedulings, information indicating the at least one RAN node 101a, 101b and at least one communications resource, information indicating the serving RAN node 101a, the second network node 101b, 115 and the third network node 110, 115, received requests and transmitted responses, and applications to perform the methods herein when being executed in the first network node 108.

The present mechanism for connecting nodes in the communications network 100 may be implemented through one or more processors, such as a processor 415 in the arrangement depicted in FIG. 4, together with computer program code for performing the functions of the embodiments herein. The processor may be for example a Digital Signal Processor (DSP), Application Specific Integrated Circuit (ASIC) processor, Field-Programmable Gate Array (FPGA) processor or microprocessor. The program code mentioned above may also be provided as a computer program product, for instance in the form of a data carrier carrying computer program code for performing the embodiments herein when being loaded into the first network node 108. One such carrier may be in the form of a CD ROM disc. It is however feasible with other data carriers such as a memory stick. The computer program code can furthermore be provided as pure program code on a server and downloaded to the first network node 108.

Those skilled in the art will also appreciate that the receiver 401, the identifying unit 403, the establishing unit 405 and the transmitter 408 described above may refer to a combination of analog and digital circuits, and/or one or more processors configured with software and/or firmware, e.g. stored in the memory 410, that when executed by the one or more processors such as the processor 415 perform as described above.

The embodiments herein are not only a local break out function for caching. The embodiments herein are not being used specific for a cache, but for all functions that needs to communicate between the service layer and the RAN layer, i.e. between the second network node 101b, 115 and the serving RAN node 101b. To enable this communication, the end points of the communication between the service layer and the RAN layer must be identified.

The embodiments herein are not limited to the above described embodiments. Various alternatives, modifications and equivalents may be used. Therefore, the above embodiments should not be taken as limiting the scope of the embodiments, which is defined by the appending claims.

The term "configured to" used herein may also be referred to as "arranged to" or "adapted to".

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in a first network node for connecting nodes in a communications network, the method comprising:
  receiving, from at least one Radio Access Network, RAN, node, information indicating the at least one RAN node and at least one communications resource which the at least one RAN node is responsible for;
  receiving, from a second network node, a request for information indicating a serving RAN node which serves a communications resource, where the communications resource indicated by the second network node is one of the at least one communications resource that the first network node received information on, and the second network node is in communication with the communications resource;
  identifying the serving RAN node based on the received information and the received request; and
  establishing a connection between the identified serving RAN node and the second network node, enabling the serving RAN node and the second network node to communicate with each other.

2. The method according to claim 1, further comprising:
  transmitting, to the second network node, a response comprising the requested information indicating the serving RAN node, the response further comprising an identity of the serving RAN node, and an identity of the communications resource served by the serving RAN node.

3. The method according to claim 1, wherein the request for information indicating the serving RAN node comprises information of an address associated with the second network node and information identifying the communications resource.

4. The method according to claim 1, wherein the at least one communications resources may be at least one of a wireless device, a cell in the communications network, a base station in the communications network, a transport link in the communications network and a processor.

5. The method according to claim 1, wherein the first network node is co-located in a node in the communications network or a standalone node in the communications network.

6. The method according to claim 1, wherein the at least one RAN node and the serving RAN node are each represented by at least one of a Base Station Controller, BSC, a Radio Network Controller, RNC, an evolved NodeB, eNB, or a WiFi controller; and
    wherein the second network node is represented by at least one of a content server, a RAN node, an Internet cache, a service layer proxy or a transport layer proxy.

7. The method according to claim 1, further comprising:
    receiving, from a third network node, information indicating that a Radio Access Bearer, RAB, is associated with a wireless device so that the RAB is registered in the first network node.

8. The method according to claim 7, wherein the received information indicating that the RAB is associated with the wireless device comprises at least one of an address to the wireless device and an identity of the wireless device, wherein the address and the identity are associated with a service established for the wireless device in the communications network.

9. The method according to claim 7, wherein the third network node is represented by at least one of a Gateway General packet radio service Support Node, GGSN, a Serving General packet radio service Support Node, SGSN, a Home Location Register, HLR, a Visiting Location Register, VLR, or a content server.

10. A first network node for connecting nodes in a communications network, the first network node comprising:
    a receiver adapted to:
        receive, from at least one Radio Access Network, RAN, node, information indicating the at least one RAN node and at least one communications resource which the at least one RAN node is responsible for; and to
        receive, from a second network node, a request for information indicating a serving RAN node which serves a communications resource, and where the communications resource indicated by the second network node is one of the at least one communications resource that the first network node received information on, and the second network node is in communication with the communications resource;
    an identifying unit adapted to identify the serving RAN node based on the received information and the received request; and
    an establishing unit adapted to establish a connection between the identified serving RAN node and the second network node, enabling the serving RAN node and the second network node to communicate with each other.

11. The first network node according to claim 10, further comprising:
    a transmitter adapted to transmit, to the second network node, a response comprising the requested information indicating the serving RAN node, the response further comprising an identity of the serving RAN node and an identity of the communications resource served by the serving RAN node.

12. The first network node according to claim 10, wherein the request for information indicating the serving RAN node comprises information of an address associated with the second network node and information identifying the communications resource.

13. The first network node according to claim 10, wherein the at least one communications resource may be at least one of a wireless device, a cell in the communications network, a base station in the communications network, a transport link in the communications network and a processor.

14. The first network node according to claim 10, wherein the first network node is co-located in a node in the communications network or a standalone node in the communications network.

15. The first network node according to claim 10, wherein the at least one RAN node and the serving RAN node are each represented by at least one of a Base Station Controller, BSC, a Radio Network Controller, RNC, an evolved NodeB, eNB, or a WiFi controller; and
    wherein the second network node is represented by at least one of a content server, a RAN node, an Internet cache, a service layer proxy or a transport layer proxy.

16. The first network node according to claim 10, wherein the receiver is further adapted to receive, from a third network node, information indicating that a Radio Access Bearer, RAB, is associated with a wireless device so that the RAB is registered in the first network node.

17. The first network node according to claim 16, wherein the received information indicating that the RAB is associated with the wireless device comprises at least one of an address to the wireless device and an identity of the wireless device, wherein the address and the identity are associated with a service established for the wireless device in the communications network.

18. The first network node according to claim 16, wherein the third network node is represented by at least one of a Gateway General packet radio service Support Node, GGSN, a Serving General packet radio service Support Node, SGSN, a Home Location Register, HLR, a Visiting Location Register, VLR, or a content server.

* * * * *